United States Patent
Teraura

(10) Patent No.: US 7,300,620 B2
(45) Date of Patent: Nov. 27, 2007

(54) METHOD FOR MANUFACTURING VARISTOR

(75) Inventor: Ryo Teraura, Shiga-ken (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 542 days.

(21) Appl. No.: 10/488,232

(22) PCT Filed: Jul. 4, 2003

(86) PCT No.: PCT/JP03/08514

§ 371 (c)(1),
(2), (4) Date: Mar. 2, 2004

(87) PCT Pub. No.: WO2004/012211

PCT Pub. Date: Feb. 5, 2004

(65) Prior Publication Data

US 2004/0195734 A1  Oct. 7, 2004

(30) Foreign Application Priority Data

Jul. 25, 2002 (JP) .............................. 2002-216121

(51) Int. Cl.
  *H01C 17/00* (2006.01)
  *C04B 35/119* (2006.01)
(52) U.S. Cl. ..................................... 264/617; 29/610.1

(58) Field of Classification Search ................ 264/616, 264/617; 29/621, 610.1; 501/26, 76
See application file for complete search history.

(56) References Cited

U.S. PATENT DOCUMENTS

2004/0066114 A1* 4/2004 Lammer ..................... 310/311
2005/0143262 A1* 6/2005 Hirose et al. ............... 505/100

FOREIGN PATENT DOCUMENTS

| JP | 63-30763 | 6/1988 |
| JP | 02081403 A * | 3/1990 |
| JP | 3-116902 | 5/1991 |
| JP | 10-0241707 | 2/2000 |

OTHER PUBLICATIONS

English translation of Korean Office Action issued Oct. 27, 2005.

* cited by examiner

*Primary Examiner*—Carlos Lopez
(74) *Attorney, Agent, or Firm*—Dickstein Shapiro LLP

(57) ABSTRACT

The raw material for a ZnO—Pr-based varistor is mixed with cobalt and potassium to prepare a ceramic raw material powder. Potassium, which is an alkali metal, is added in the form of $KClO_4$, $KHC_4H_4O_6$, $PtCl_6$, or $K_3[Co(NO_2)_6]$. The ceramic raw material powder is pulverized by a wet process while 0.1 to 5.0 wt % of polycarboxylate dispersant is added to the powder. Such a method can produce a reliable, high-quality varistor having excellent varistor characteristics, such as varistor voltage $V_{1mA}$ and insulation resistance IR, and less variation in these characteristics.

12 Claims, 3 Drawing Sheets

METHOD FOR MANUFACTURING VARISTOR

TECHNICAL FIELD

The present invention relates to varistor manufacturing methods and varistors. In particular, the present invention relates to a varistor manufacturing method including a step of mixing zinc oxide (ZnO), as the major component, and a compound containing potassium (K), as a minor component, and pulverizing the mixture by a wet process, and also relates to a varistor manufactured by this method.

BACKGROUND ART

The major components of well-known varistor compositions include SiC, SrTiO$_3$, and ZnO such as ZnO—Bi and ZnO—Pr. Among them, ZnO—Bi-based and ZnO—Pr-based varistors are becoming widespread as surge protectors. ZnO—Bi-based and ZnO—Pr-based varistors, having more excellent voltage nonlinearity and surge current capability than SiC-based and SrTiO$_3$-based varistors, deliver high ability to protect electronic devices from surge currents.

Between these two types of ZnO-based varistors, ZnO—Pr-based varistors exhibit excellent voltage nonlinearity but produce a larger leakage current than ZnO—Bi-based varistors.

To solve this disadvantage, for example, Japanese Examined Patent Application Publication No. 63-30763 proposes a ZnO—Pr-based varistor containing minor components such as praseodymium (Pr); cobalt (Co); at least two of potassium (K), rubidium (Rb), and cesium (Cs); chromium (Cr); and at least one of magnesium (Mg) and calcium (Ca).

To reduce the leakage current, specifically, this varistor contains 0.1 to 5 atm % of praseodymium; 0.5 to 5 atm % of cobalt; 0.05 to 0.5 atm % in total of potassium, rubidium, and cesium; 0.05 to 0.5 atm % of chromium; and 0.01 to 2 atm % of magnesium and/or calcium.

These additives are used in the form of metal oxides or, for example, carbonates, hydroxides, or fluorides, which form oxides by firing.

A ZnO-based varistor positively uses crystal grain boundaries in a ceramic sintered compact. Two crystal grains and their grain boundary provide the minimum unit of the varistor. This varistor, therefore, exhibits excellent voltage nonlinearity. In addition, the voltage nonlinearity can be controlled by, for example, changing the types of the additives used.

However, the voltage nonlinearity decreases by defective grain boundaries, which may increase by, for example, nonuniform precipitation of added elements and the yield of compounds from the added elements. In particular, varistor characteristics such as insulation resistance largely depend on alkali metals precipitated on crystal grain boundaries. For low-voltage varistors containing a small number of crystal grain boundaries, defective grain boundaries generated by the nonuniform precipitation of the added elements and compositional variations impair electrostatic discharge (hereinafter referred to as ESD) characteristics. Such an impairment in the ESD characteristics results in decreases and variations in varistor voltage Vow and insulation resistance IR.

For such a varistor as proposed above, potassium, which is an alkali metal and is added in the form of a soluble potassium compound such as potassium oxide, potassium carbonate, potassium hydroxide, and potassium fluoride, may dissolve in water contained in a first slurry during pulverizing by a wet process. Then, potassium is removed together with water during dehydration, leading to a variation in the composition of the resultant material, that is, a compositional variation. The compositional variation makes it difficult to provide a high-quality varistor having excellent and stable varistor characteristics.

In addition, the dissolution of the potassium compound into water causes a variation in the pH of the first slurry. Such a variation may increase the viscosity of the first slurry to decrease the miscibility, millability and dispersibility of the first slurry. In the first slurry, which is a mixture of solid and liquid, each element is dispersed by electrostatic repulsion caused by the zeta ($\zeta$) potential of the element. The zeta potential depends on the hydrogen ion exponent, namely pH, of the first slurry. If the pH of the slurry varies by the hydration of the potassium compound to a zeta potential of 0 (zero), particles no longer repel each other in the first slurry. Then, the slurry fails to maintain its dispersion system. As a result, the particles aggregate to increase the viscosity of the slurry, leading to decreases in the miscibility, millability, and dispersibility of the slurry.

Furthermore, during drying after the dehydration, potassium readily aggregates and nonuniformly precipitates through recrystallization to decrease the dispersibility. This may result in further impairment in the varistor characteristics.

The present invention is based on the above problems. Accordingly, an object of the present invention is to provide a method for manufacturing a reliable, high-quality varistor that has excellent varistor characteristics such as varistor voltage $V_{1mA}$ and insulation resistance IR and that can prevent variations in these characteristics, and also provide the varistor.

DISCLOSURE OF INVENTION

The present invention provides a method for manufacturing a varistor. This method includes a step of mixing and pulverizing zinc oxide, as the major component, and a compound containing potassium, as a minor component, by a wet process. In this method, the compound containing potassium is a poorly soluble potassium compound.

According to the present invention, potassium, which is added in the form of a poorly soluble potassium compound, does not dissolve in a first slurry containing water as a solvent in the mixing and pulverizing step, causing no compositional variation. In addition, such a compound, which does not dissolve in the first slurry, does not vary the pH of the first slurry, preventing an increase in the slurry viscosity and decreases in the miscibility, millability, and dispersibility. Furthermore, such a compound can prevent the aggregation and nonuniform precipitation of potassium through recrystallization during the drying. The present invention, therefore, can provide a method for manufacturing a reliable varistor that can operate at low voltage.

In this method, a compound containing praseodymium and a compound containing cobalt are preferably used as additional minor components. These compounds serve to reduce the leakage current of the varistor.

To enhance the above effects, the solubility of potassium contained in the poorly soluble potassium compound used is preferably 3 g or less in 100 g of aqueous solution at 25° C. Preferred examples of the poorly soluble potassium compound used include at least one material selected from the group consisting of potassium perchlorate, potassium bitartrate, potassium hexachloroplatinate, and potassium hexanitrocobaltate.

In the varistor manufacturing method of the present invention, therefore, the solubility of potassium contained in the poorly soluble potassium compound is preferably 3 g or less in 100 g of aqueous solution at 25° C. The poorly soluble potassium compound preferably includes at least one material selected from the group consisting of potassium perchlorate, potassium bitartrate, potassium hexachloroplatinate, and potassium hexanitrocobaltate.

Furthermore, an intensive study by the present inventor has found that a dispersant added in the mixing and pulverizing step can homogeneously disperse the components in combination with the poorly soluble potassium compound to prevent defective grain boundaries. The study has also found that the dispersant added is preferably a polycarboxylate dispersant in view of the environment and the durability of the firing furnace used.

In the varistor manufacturing method of the present invention, therefore, the mixing and pulverizing step preferably further includes the addition of a polycarboxylate dispersant.

The study has also found that the amount of the dispersant added is preferably 0.1 to 5.0 wt % of the total weight of the major and minor components in view of retaining desirable dispersibility.

In the varistor manufacturing method of the present invention, therefore, the amount of the polycarboxylate dispersant added is preferably 0.1 to 5.0 wt % of the total weight of the major and minor components.

The present invention further provides a varistor manufactured by the above manufacturing method.

During the manufacturing process, potassium does not dissolve or is not removed, providing excellent dispersibility. The present invention, therefore, can provide a reliable varistor that can operate at low voltage and that has excellent varistor characteristics.

BEST MODE FOR CARRYING OUT THE INVENTION

Embodiments of the present invention will now be described in detail.

Figure 1:
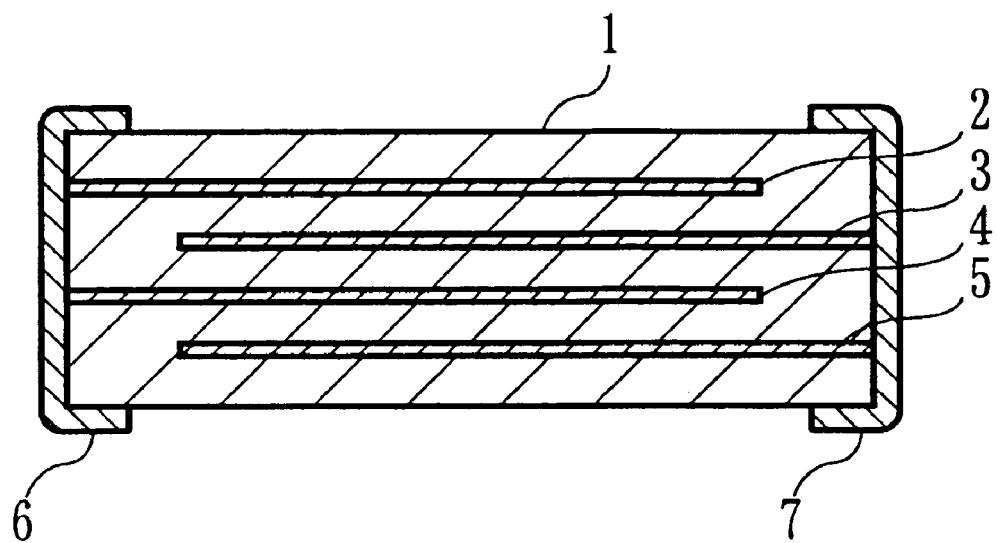
FIG. 1 is a sectional view of a multilayer varistor manufactured by a varistor manufacturing method according to an embodiment of the present invention.

FIG. 1 is a longitudinal sectional view of a multilayer varistor according to an embodiment of the present invention.

This multilayer varistor includes a ceramic sintered compact 1, internal electrodes 2 to 5, and external electrodes 6 and 7. The internal electrodes 2 to 5 are composed of a conductive material such as platinum and silver and are embedded in the ceramic sintered compact 1. The external electrodes 6 and 7 are composed of a conductive material such as platinum and silver and are disposed at both ends of the ceramic sintered compact 1. The internal electrodes 2 and 4 are electrically connected to the external electrode 6 while the internal electrodes 3 and 5 are electrically connected to the external electrode 7.

A method for manufacturing the above varistor will now be described in detail.

First, predetermined amounts of ZnO, which is the major component, $Pr_6O_{11}$, $Co_3O_4$, $CaCO_3$, $Al_2O_3$, and a poorly soluble potassium compound, which are minor components, are weighed so as to provide a predetermined composition.

The potassium compound, in contrast to the other additives, is poorly soluble for the following reason.

For soluble potassium compounds such as $K_2O$ and $K_2CO_3$, potassium is removed together with water during dehydration after pulverizing by a wet process, which will be described later, to cause the compositional variation of the resultant varistor. In addition, a soluble potassium compound dissolves in a solvent contained in a first slurry, so that the pH of the first slurry varies. As a result, the viscosity of the first slurry increases to decrease the dispersibility of each component. Furthermore, during drying, potassium aggregates and precipitates nonuniformly through recrystallization to produce defective grain boundaries, leading to an impairment in varistor characteristics.

The varistor characteristics, such as insulation resistance IR, largely depend on potassium precipitated on crystal grain boundaries. Therefore, a variation in the composition of potassium and a decrease in the dispersibility of the slurry caused by, for example, the recrystallization of potassium develop a variation in initial insulation resistance IR.

In this embodiment, therefore, potassium is added in the form of a poorly soluble potassium compound.

Specifically, the poorly soluble potassium compound used preferably has a solubility of 3 g or less in 100 g of aqueous solution at 25° C. If the solubility exceeds 3 g, potassium dissolves in water, is removed together with water in dehydration, and nonuniformly precipitates through recrystallization during drying to impair the varistor characteristics. Under these conditions, the lowest possible solubility is desirable.

Examples of such a poorly soluble potassium compound include potassium perchlorate ($KClO_4$), potassium bitartrate ($KHC_4H_4O_6$), potassium hexachloroplatinate ($K_2(PtCl_6)$), and potassium hexanitrocobaltate $K_3[Co(NO_2)_6]$).

Next, the weighed raw materials are mixed with ion-exchange water and a polycarboxylate dispersant in an amount of 0.1 to 5.0 wt % of the raw materials in a ball mill containing milling media of, for example, zirconia to form a first slurry. In the first slurry, these components are pulverized by a wet process and homogeneously dispersed.

The polycarboxylate dispersant is added to the raw materials for the following reason.

A dispersant is preferably added to the raw materials because it can homogeneously disperse the components in the first slurry in combination with the poorly soluble potassium compound.

Among several types of dispersants, the polycarboxylate dispersant is preferably used as the additive for the raw materials. If, for example, a sulfonate dispersant is added to the raw materials, it generates sulfur oxides during firing, which will be described later. Such sulfur oxides may damage the firing furnace used and impair its durability.

In addition, the polycarboxylate dispersant is added by 0.1 to 5.0 wt % for the following reason.

If the amount of the polycarboxylate dispersant added is less than 0.1 wt %, the particles of the components unsatisfactorily adsorb the dispersant. As a result, the viscosity of the first slurry increases, leading to insufficient millability and dispersibility during pulverizing by a wet process. On the other hand, if the amount of the polycarboxylate dispersant added is excessively large, that is, more than 5.0 wt %, a dispersant component adsorbed on one particle comes into contact with another dispersant component adsorbed on another particle. Such dispersant components may entangle in to reaggregate. Therefore, the amount of the polycarboxylate dispersant added ranges preferably from 0.1 to 5.0 wt % of the total amount of the major and minor components, more preferably from 0.5 to 3.5 wt % of the total amount of the major and minor components. Examples of the polycarboxylate dispersant added include ammonium polycarboxylates and sodium polycarboxylates.

After the pulverizing by a wet process, the first slurry is dehydrated and dried to prepare granules. These granules are calcined under predetermined conditions and are thoroughly pulverized to prepare a calcined powder.

This calcined powder is mixed with an organic binder, an organic solvent, and an organic plasticizer to prepare a second slurry for sheeting.

Figure 2:
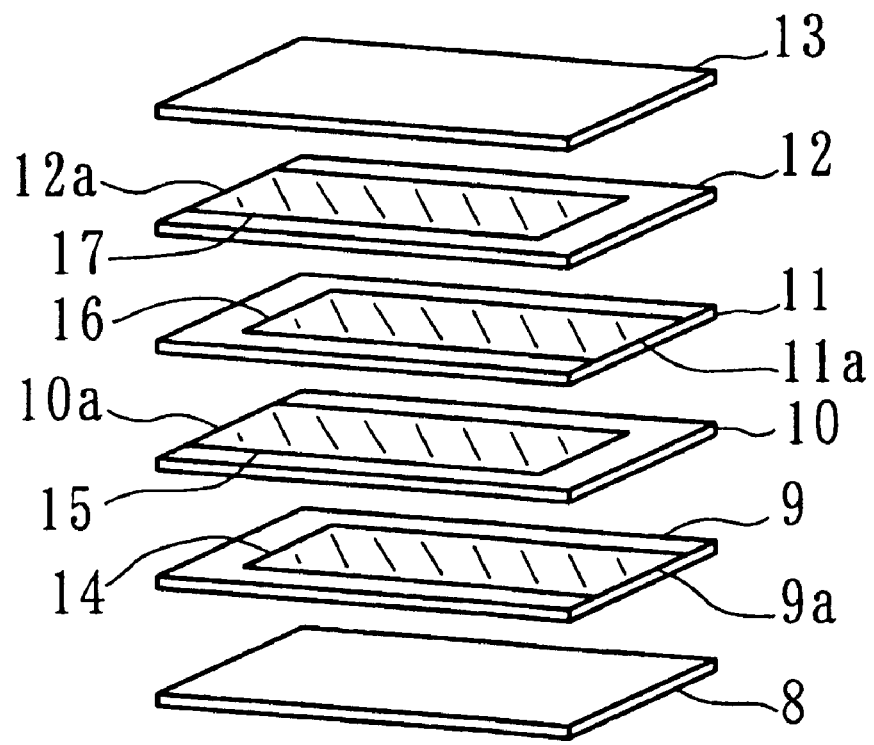
FIG. 2 illustrates a major step of the varistor manufacturing method according to the present invention.

This second slurry is shaped by doctor blading to prepare ceramic green sheets 8 to 13 having a predetermined thickness, as illustrated in FIG. 2.

Then, conductor patterns 14 to 17 of the internal electrodes are formed by screen printing on the top surfaces of the ceramic green sheets 9 to 12 with a conductive paste mainly containing platinum (hereinafter referred to as a platinum paste). The conductor patterns 14 to 17 are formed in strips and extend from end surfaces 9a to 12a. The other ends of the conductor patterns 14 to 17 are located on the ceramic green sheets 9 to 12. The ceramic green sheets 9 to 12, on which the conductor patterns are printed, are laminated, are sandwiched by the ceramic green sheets 8 and 13 as protective layers, and are compacted to form an unfired laminate.

This laminate is cut to a predetermined size, is held in an alumina case, is debinded, and is fired to prepare the ceramic sintered compact 1, namely, the fired laminate. This ceramic sintered compact 1, which is a rectangular parallelepiped, includes the internal electrodes 2 to 5.

Subsequently, another conductive paste mainly containing silver (hereinafter referred to as a silver paste) is applied on both ends of the ceramic sintered compact 1 and is fired to form the external electrodes 6 and 7. As a result, the multilayer varistor is completed.

According to this embodiment, in the mixing and pulverizing step, potassium is added to ZnO in the form of a poorly soluble compound such as $KClO_4$ and $KHC_4H_4O_6$ (namely, a potassium compound having a solubility of 3 g or less in 100 g of aqueous solution at 25° C.). If such a compound is used, potassium does not dissolve in water or is not removed together with water during the dehydration. Therefore, the first slurry can have excellent dispersibility and avoid the aggregation and nonuniform precipitation of potassium through recrystallization during the drying. Thus, this embodiment can provide a reliable multilayer varistor having stable varistor characteristics.

In addition, in the mixing and pulverizing step, 0.1 to 5.0 wt % of the polycarboxylate dispersant is added to the raw materials. This dispersant can homogeneously disperse the components in combination with the poorly soluble potassium compound to prevent the generation of defective grain boundaries during the precipitation of potassium on crystal grain boundaries after the firing. This embodiment, therefore, can provide a reliable multilayer varistor that has desirable varistor characteristics and that can be readily manufactured at low cost.

The present invention will now be described according to examples.

FIRST SET OF EXAMPLES

Varistors containing ZnO and a soluble or poorly soluble potassium compound were manufactured and evaluated for a variety of varistor characteristics.

Example 1

First, $Pr_6O_{11}$, $Co_3O_4$, $CaCO_3$, $Al_2O_3$, and $KClO_4$ powders were each weighed with reference to a ZnO powder being the major component such that praseodymium accounted for 0.3 atm %, cobalt for 2.0 atm %, calcium for 0.2 atm %, aluminum for $1\times10^{-4}$ atm %; and potassium for 0.5 atm %. The $Pr_6O_{11}$, $Co_3O_4$, $CaCO_3$, and $Al_2O_3$ powders had good solubility, while the $KClO_4$ powder had poor solubility, that is, a solubility of 3 g or less in 100 g of water at 25° C.

These raw materials were mixed and pulverized with ion-exchange water in a ball mill containing milling media of partially stabilized zirconia (PSZ) to prepare a first slurry containing pure water as the solvent. The weight of the ion-exchange water was three times as large as the total weight of the raw materials to minimize the viscosity of the first slurry (slurry viscosity). Subsequently, the first slurry was dehydrated and dried to prepare granules. These granules were then calcined in air at 800° C. for two hours and were thoroughly pulverized to prepare a calcined powder.

This calcined powder was mixed with predetermined amounts of polyvinyl butyral as an organic binder, dibutyl phthalate as an organic plasticizer, and toluene and ethyl alcohol as organic solvents. This mixture was pulverized by a wet process to prepare a second slurry for use in forming ceramic green sheets.

This second slurry was applied on a polyethylene terephthalate (PET) film by doctor blading to form a sheet having a thickness of approximately 30 μm. The resultant sheet was cut to prepare many ceramic green sheets with a predetermined size.

Then, the platinum paste was applied on the top surfaces of the ceramic green sheets by screen printing to form strip electrode patterns. These electrode patterns extended from end surfaces of the ceramic green sheets. The other ends of the electrode patterns were located on the ceramic green sheets.

The ceramic green sheets, on which the electrode patterns were formed, were laminated, were sandwiched by additional ceramic green sheets having no electrode pattern as protective layers, and were compacted to form a laminate.

This laminate was trimmed to 1.6 mm in length by 0.8 mm in width, was held in an alumina case, was debinded in air at 500° C., and was fired in air at 1,200° C. for two hours to prepare a ceramic sintered compact.

Subsequently, the silver paste was applied on both ends of the ceramic sintered compact and was fired at 800° C. to form external electrodes. As a result, a multilayer varistor of Example 1 was completed.

Examples 2 to 4

Multilayer varistors were manufactured which contained potassium in the form of $KHC_4H_4O_6$ (Example 2), $K_2(PtCl_6)$ (Example 3), or $K_3[Co(NO_2)_6]$. (Example 4), instead of $KClO_4$.

Comparative Examples 1 to 12

In the same manner as in Example 1, multilayer varistors were manufactured each of which contained potassium not in the form of a poorly soluble potassium compound but in any one of the following forms of soluble potassium compounds: potassium fluoride (KF) (Comparative Example 1), potassium carbonate ($K_2CO_3$) (Comparative Example 2), potassium oxide ($K_2O$) (Comparative Example 3), potassium hydroxide (KOH) (Comparative Example 4), potassium chloride (KCl) (Comparative Example 5), potassium bromide (KBr) (Comparative Example 6), potassium phosphate ($K_3PO_4$) (Comparative Example 7), potassium permanganate ($KHMnO_4$) (Comparative Example 8), potassium sulfate ($K_2SO_4$) (Comparative Example 9), potassium sulfide ($K_2S$) (Comparative Example 10), potassium nitrate ($KNO_3$) (Comparative Example 11), and potassium iodide (KI) (Comparative Example 12). These compounds had solubilities of 10 g or more in 100 g of water at 25° C.

A total of 100 test pieces were prepared for each of Examples 1 to 4 and Comparative Examples 1 to 12. These test pieces were measured for varistor voltage $V_{1mA}$, variations in varistor voltage $V_{1mA}$, voltage nonlinearity coefficient α, initial insulation resistance IR, variations in initial insulation resistance IR, and ESD susceptibility, which indicates ESD characteristics.

Varistor voltage $V_{1mA}$ was determined by measuring the voltage across each test piece when a direct current of 1 mA was applied through the test piece.

Voltage nonlinearity coefficient α was calculated from varistor voltage $V_{1mA}$ and the voltage across each test piece when a direct current of 0.1 mA was applied through the test piece, based on Equation (1):

$$\alpha = \frac{\log(I_{1mA}/I_{0.1mA})}{\log(V_{1mA}/V_{0.1mA})} \quad (1)$$

Initial insulation resistance IR was measured with an ultra-high-resistance microammeter ("R8340A," made by ADVANTEST CORPORATION) while a DC voltage in an amount of 60% of varistor voltage $V_{1mA}$ was applied to each test piece for 0.1 seconds.

Variations in varistor voltage $V_{1mA}$ and initial insulation resistance IR were determined from changes by percent between the minimum and maximum values of varistor voltage $V_{1\ mA}$ and initial insulation resistance IR. Varistors having 15% or less of variations in varistor voltage $V_{1\ mA}$ and 30% or less of variations in insulation resistance IR were determined to be non-defective.

In addition, the ESD susceptibility was calculated in the following procedure.

Figure 3:
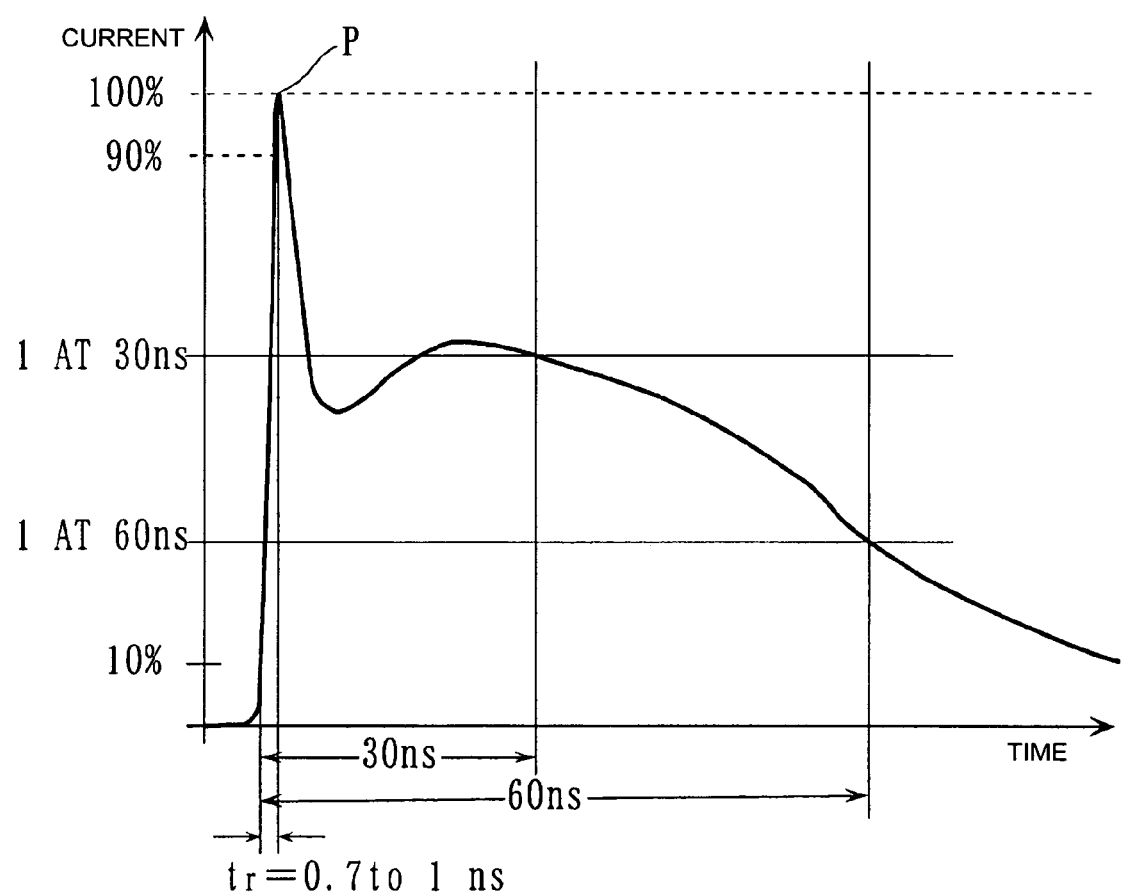
FIG. 3 is a graph showing the waveform of ESD pulses used in the measurement of ESD susceptibility.

First, 10 ESD pulses according to International Electrotechnical Commission (IEC) 801.2, as illustrated in FIG. 3, were applied across each test piece. A change $\Delta V_{1mA}/V_{1mA}$ by percent in varistor voltage was calculated from a difference $\Delta V_{1mA}$ in varistor voltage between before and after the application and varistor voltage $V_{1mA}$ before the application. Then, a difference $\Delta \log IR$ in insulation resistance between before and after the application was calculated. The maximum applied voltage at which the change $\Delta V_{1mA}/V_{1mA}$ by percent in varistor voltage was within ±10% and the difference $\Delta \log IR$ in insulation resistance was ½ was calculated as the ESD susceptibility. In FIG. 3, tr indicates the time for the rising edge, P indicates a 100% peak current, 1 AT 30 ns indicates the amplitude at 30 ns, and 1 AT 60 ns indicates the amplitude at 60 ns.

Table 1 below shows the measurements for each example and comparative example.

TABLE 1

| | | Molecular formula | Varistor voltage $V_{1mA}$ (V) | Variation in varistor voltage $V_{1mA}$ (%) | Voltage nonlinearity coefficient α (−) | Insulation resistance IR (MΩ) | Variation in insulation resistance IR (%) | ESD susceptibility (kV) | Determination |
|---|---|---|---|---|---|---|---|---|---|
| Example | 1 | $KClO_4$ | 9.0 | 14 | 24 | 7.5 | 30 | 30 | non-defective |
| | 2 | $KHC_4H_4O_6$ | 9.1 | 13 | 23 | 8.1 | 29 | 30 | non-defective |
| | 3 | $K_2(PtCl_6)$ | 9.2 | 13 | 22 | 8.0 | 27 | 30 | non-defective |
| | 4 | $K_2[Co(NO_2)_4]$ | 9.1 | 11 | 23 | 8.3 | 28 | 30 | non-defective |
| Comparative example | 1 | KF | 8.2 | 25 | 20 | 1.0 | 200 | 5 | defective |
| | 2 | $K_2CO_3$ | 8.3 | 27 | 21 | 1.1 | 280 | 5 | defective |
| | 3 | $K_2O$ | 7.5 | 26 | 22 | 1.2 | 200 | 5 | defective |
| | 4 | KOH | 7.9 | 21 | 21 | 1.3 | 250 | 5 | defective |
| | 5 | KCl | 6.5 | 29 | 20 | 1.5 | 220 | 5 | defective |
| | 6 | KBr | 7.3 | 25 | 23 | 1.2 | 20 | 5 | defective |
| | 7 | $K_3PO_4$ | 7.9 | 23 | 22 | 1.8 | 200 | 5 | defective |
| | 8 | $KHMnO_4$ | 6.9 | 26 | 21 | 1.4 | 250 | 5 | defective |
| | 9 | $K_2SO_4$ | 7.8 | 25 | 22 | 1.0 | 200 | 5 | defective |
| | 10 | $K_2S$ | 7.2 | 22 | 22 | 1.2 | 200 | 5 | defective |
| | 11 | $KNO_3$ | 8.1 | 23 | 21 | 1.1 | 240 | 5 | defective |
| | 12 | KI | 8.3 | 22 | 22 | 1.3 | 200 | 5 | defective |

As is obvious in Table 1, the varistors of Comparative Examples 1 to 12, containing the soluble potassium compounds, exhibit more than 20% of variations in varistor voltage $V_{1\ mA}$ and more than 200% of variations in insulation resistance IR.

In contrast, the varistors of Example 1 to 4, containing the poorly soluble potassium compounds, could suppress the variations in varistor voltage $V_{1\ mA}$ to 15% or less and the variations in initial insulation resistance IR to 30% or less. These results show that these varistors exhibited suppressed variations in the varistor characteristics and improved ESD characteristics.

Then, the varistors of the examples and comparative examples were analyzed for the composition of potassium by inductively coupled plasma (ICP) emission spectroscopy. The amount of change in the potassium content of each varistor was calculated from the potassium content before processing (the potassium content of the raw materials) and potassium content after processing (the potassium content of the varistor after firing). Subsequently, this amount of change was divided by the potassium content before processing to determine its change by percent.

Table 2 below shows the analyses of the composition of potassium.

TABLE 2

|  |  | Potassium content before processing (atom %) | Potassium content after processing (atom %) | Amount of change (atom %) | Change by percent (%) |
|---|---|---|---|---|---|
| Example | 1 | 0.5 | 0.47 | 0.03 | 6 |
|  | 2 | 0.5 | 0.47 | 0.03 | 6 |
|  | 3 | 0.5 | 0.48 | 0.02 | 4 |
|  | 4 | 0.5 | 0.45 | 0.05 | 10 |
| Comparative example | 1 | 0.5 | 0.22 | 0.28 | 56 |
|  | 2 | 0.5 | 0.16 | 0.34 | 68 |
|  | 3 | 0.5 | 0.28 | 0.22 | 44 |
|  | 4 | 0.5 | 0.25 | 0.25 | 50 |
|  | 5 | 0.5 | 0.33 | 0.17 | 34 |
|  | 6 | 0.5 | 0.15 | 0.35 | 70 |
|  | 7 | 0.5 | 0.11 | 0.39 | 78 |
|  | 8 | 0.5 | 0.14 | 0.36 | 72 |
|  | 9 | 0.5 | 0.18 | 0.32 | 64 |
|  | 10 | 0.5 | 0.23 | 0.27 | 54 |
|  | 11 | 0.5 | 0.21 | 0.29 | 58 |
|  | 12 | 0.5 | 0.14 | 0.36 | 72 |

As is obvious in Table 2, the potassium contents of the varistors of Comparative Examples 1 to 12 decreased by 0.17 to 0.39 atom % after processing, and their changes ranged from 34% to 78%. This is because, for these varistors, potassium was dissolved in water or was removed together with water during the manufacturing process. These results indicate that the compositional variation occurred. In addition, the dispersibility of potassium decreased through, for example, recrystallization due to its good solubility in water, leading to decreases in voltage nonlinearity coefficient α, initial insulation resistance IR, and the ESD susceptibility, as shown by the results in Table 1.

On the other hand, the potassium contents of the varistors of Example 1 to 4 decreased by at most 0.05 atom % after processing, and their changes were 10% or less. These results indicate that the compositional variation of potassium did not occur. Therefore, as shown in Table 1, these varistors could avoid a decrease in initial insulation resistance IR and suppress variations in varistor voltage $V_{1\,mA}$ and initial insulation resistance IR.

SECOND SET OF EXAMPLES

Varistors were manufactured with different dispersants and were evaluated for a variety of varistor characteristics.

The poor soluble potassium compound used was $KHC_4H_4O_6$. ZnO, which was the major component, $Pr_6O_{11}$, $Co_3O_4$, $CaCO_3$, $Al_2O_3$, and $KHC_4H_4O_6$, which were minor components, were each weighed. These weighed raw materials were mixed and pulverized by a wet process while ion-exchange water and dispersants were added to them. Subsequently, multilayer varistors were manufactured in the same method and procedure as in the first set of examples, and were evaluated for a variety of varistor characteristics.

Specifically, the dispersant used was an ammonium polycarboxylate in Example 21, a sodium polycarboxylate in Example 22, an ammonium polysulfonate in Comparative Example 21, and a sodium polysulfonate in Comparative Example 22.

In the second set of examples, the weight of the ion-exchange water added was equivalent to the total weight of the raw materials to examine the effect of the dispersants. The amount of the dispersant added was 1.0 wt % of the raw materials.

A total of 100 test pieces were prepared for each of Examples 21 and 22 and Comparative Examples 21 and 22. These test pieces were measured for varistor voltage $V_{1mA}$, variations in varistor voltage $V_{1mA}$, voltage nonlinearity coefficient α, initial insulation resistance IR, variations in initial insulation resistance IR, as in the first set of examples, and additionally surge current capability.

The surge current capability was calculated in the following procedure.

Figure 4:
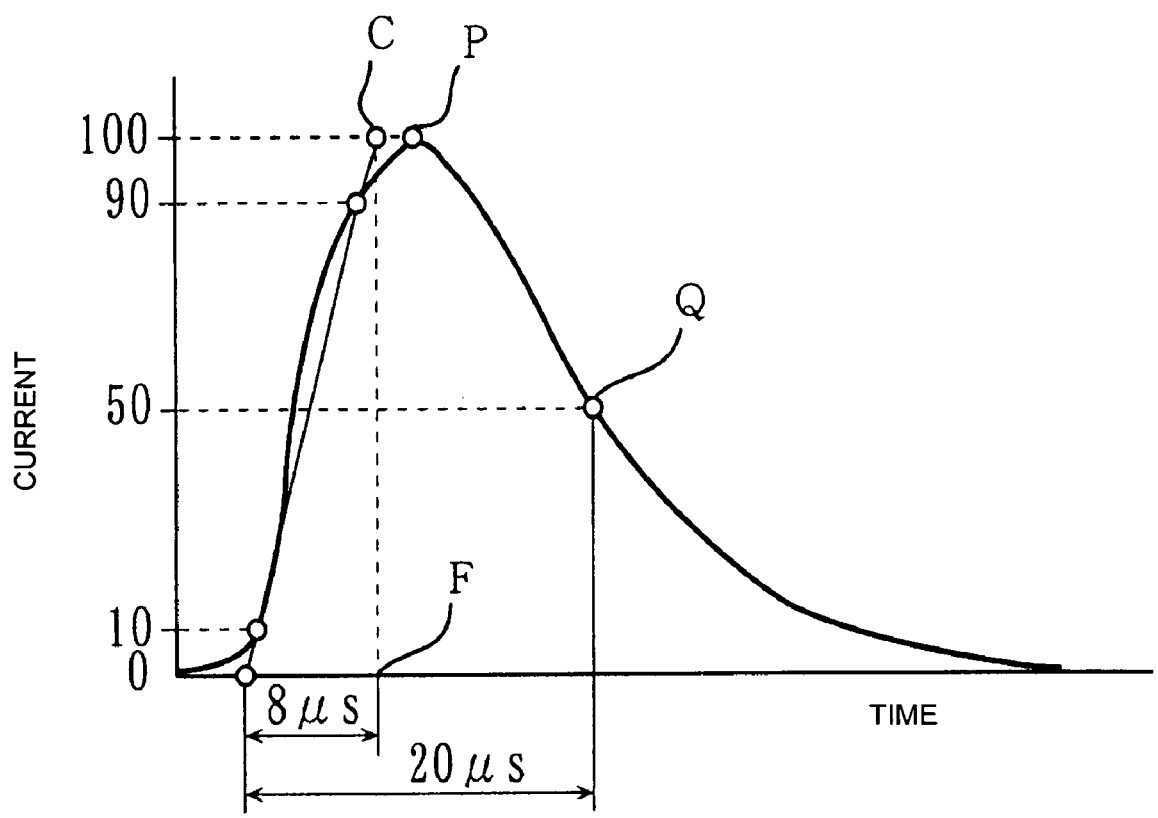
FIG. 4 is a graph showing the waveform of surge currents used in the measurement of surge current capability.

Referring to FIG. 4, two triangular current waves of 8 by 20 μs, which had a duration of wave front of 8 μs and a duration of wave tail of 20 μs, were applied across each test piece at an interval of five minutes. The change $\Delta V_{1mA}/V_{1mA}$ by percent in varistor voltage was calculated from the difference $\Delta V_{1mA}$ in varistor voltage between before and after the application and varistor voltage $V_{1mA}$ before the application. Then, the difference $\Delta \log IR$ in insulation resistance between before and after the application was calculated. The wave crest value at which the change $\Delta V_{1mA}/V_{1mA}$ by percent in varistor voltage was within ±10% and the difference $\Delta \log IR$ in insulation resistance was ½ was calculated as the surge current capability. Varistors having surge current capabilities of 30 A/mm² or more were determined to be non-defective. In FIG. 4, CF indicates the wave crest value, P indicates the wave crest, and Q indicates a half wave crest.

Table 3 below shows the measurements for each example and comparative example.

TABLE 3

|  |  | Name of dispersant | Varistor voltage $V_{1mA}$ (V) | Variation in varistor voltage $V_{1mA}$ (%) | Voltage nonlinearity coefficient α (−) | Insulation resistance IR (MΩ) | Variation in insulation resistance IR (%) | Surge current capability (A/mm²) |
|---|---|---|---|---|---|---|---|---|
| Example | 21 | Ammonium polycarboxylate | 9.1 | 5 | 23 | 7.3 | 17 | 45 |
|  | 22 | Sodium polycarboxylate | 9.9 | 8 | 20 | 7.5 | 15 | 47 |
| Comparative example | 21 | Ammonium polysulfonate | 9.3 | 6 | 21 | 8.1 | 14 | 40 |
|  | 22 | Sodium polysulfonate | 9.7 | 5 | 23 | 8.5 | 14 | 40 |

As is obvious in Table 3, any of the varistors of Examples 21 and 22 and Comparative Examples 21 and 22 exhibited excellent surge characteristics and less variations in varistor voltage Vow and insulation resistance IR than the varistors of Examples 1 to 4 in Table 1, which contained no dispersant. These results show that the dispersants could homogeneously disperse the components in combination with the poorly soluble potassium compounds to prevent defective grain boundaries.

The varistors of Comparative Examples 21 and 22 had excellent varistor characteristics, but contained a polysulfonate dispersant, which generates sulfur oxides during firing. Such sulfur oxides may damage the firing furnace used and impair its durability.

Therefore, polycarboxylate dispersants are more desirable in view of the environment and the durability of the firing furnace used. The above results show that polycarboxylate dispersants permit the suppression of variations in varistor voltage $V_{1mA}$ and insulation resistance IR.

THIRD SET OF EXAMPLES

Varistors containing different amounts of dispersant were manufactured and were evaluated for a variety of varistor characteristics.

The poorly soluble potassium compound used was $KHC_4H_4O_6$, the dispersant used was an ammonium polycarboxylate, and the solvent used was ion-exchange water. Multilayer varistors containing different amounts of dispersant were manufactured and measured for the slurry viscosity, initial insulation resistance IR, and variations in initial insulation resistance IR.

Specifically, multilayer varistors (Examples 31 to 42) containing the dispersant in the range of 0.1 to 5.0 wt % and multilayer varistors (Comparative Examples 31 to 33) containing 0.05 wt %, 5.50 wt %, and 6.00 wt % of dispersant, respectively, were manufactured. The slurry viscosities were measured with a simple viscometer. Initial insulation resistance IR and its variations were calculated in the same manner as in the first set of examples. In the third set of examples, as in the second set of examples, the weight of the ion-exchange water added was equivalent to the total weight of the raw materials to calculate the slurry viscosities to the amounts of dispersant added, initial insulation resistance IR, and the variations in initial insulation resistance IR.

Table 4 below shows the results.

TABLE 4

| | | Amount of dispersant added (wt %) | Viscosity (Pa · s) | Insulation resistance IR (MΩ) | Variation in insulation resistance IR (%) |
|---|---|---|---|---|---|
| Example | 31 | 0.10 | 0.480 | 8.1 | 25 |
| | 32 | 0.30 | 0.031 | 9.2 | 20 |
| | 33 | 0.50 | 0.020 | 9.0 | 20 |
| | 34 | 1.00 | 0.019 | 8.1 | 20 |
| | 35 | 1.50 | 0.020 | 8.4 | 20 |
| | 36 | 2.00 | 0.022 | 8.6 | 20 |
| | 37 | 2.50 | 0.019 | 8.9 | 20 |
| | 38 | 3.00 | 0.020 | 8.1 | 20 |
| | 39 | 3.50 | 0.021 | 8.8 | 20 |
| | 40 | 4.00 | 0.020 | 8.9 | 20 |
| | 41 | 4.50 | 0.090 | 8.7 | 20 |
| | 42 | 5.00 | 0.170 | 7.9 | 30 |
| Comparative example | 31 | 0.05 | 1.500 | 1.2 | 320 |
| | 32 | 5.50 | 0.550 | 4.0 | 60 |
| | 33 | 6.00 | 0.780 | 4.0 | 130 |

As is obvious in Table 4, the varistor of Comparative Example 31, containing a small amount (namely, 0.05 wt %) of dispersant, exhibited poor adsorption of the dispersant onto the particles of the raw materials to result in a slurry viscosity of 1.500 Pa·s. In Comparative Example 31, consequently, a decrease in dispersibility led to a large variation of 320% in initial insulation resistance IR.

The varistors of Comparative Examples 32 and 33, containing 5.5 wt % or more of dispersant, exhibited a slurry viscosity of 0.550 Pa·s or more. These results show that the dispersant entangled in and reaggregated the particles of the raw materials to develop a decrease and variation in initial insulation resistance IR.

On the other hand, the varistors of Examples 31 to 42 exhibited slurry viscosities of 0.500 Pa·s or less. Among them, the varistors containing the dispersant in the range of 0.3 to 4.5 wt % exhibited largely decreased slurry viscosities, namely, 0.100 Pa·s or less. Such viscosities can facilitate the mixing and pulverizing of slurries to provide excellent dispersibility of the raw materials, leading to an increase in initial insulation resistance IR. The above results show that the varistors of Examples 31 to 42 could have suppressed variations in initial insulation resistance IR of 30% or less.

As described above in detail, this embodiment provides a varistor manufacturing method including the step of mixing and pulverizing zinc oxide, as the major component, and at least a compound containing praseodymium, a compound containing cobalt, and a compound containing potassium, as minor components, by a wet process. In this method, potassium is added in the form of a poorly soluble potassium compound in which the solubility of potassium contained is 3 g or less in 100 g of aqueous solution at 25° C., for example, in the form of $KClO_4$, $KHC_4H_4O_6$, $K_2(PtCl_6)$, or $K_3[Co(NO_2)_6]$. If such a compound is used, potassium does not dissolve in water or is not removed together with water during the dehydration, causing no compositional variation. In addition, such a compound does not vary the pH of the first slurry, preventing an increase in the slurry viscosity and decreases in the miscibility, millability, and dispersibiity. Furthermore, such a compound can prevent the aggregation and nonuniform precipitation of potassium through recrystallization during the drying. This embodiment, therefore, can provide a method for manufacturing a reliable varistor that can operate at low voltage.

In addition, 0.1 to 5.0 wt % of polycarboxylate dispersant is added in the mixing and pulverizing step. This dispersant can homogeneously disperse the components in combination with the poorly soluble potassium compound to prevent defective grain boundaries. This dispersant is also desirable in view of the environment and the durability of the manufacturing equipment used. Therefore, this embodiment can provide an easy method for manufacturing a varistor having less variation in the varistor voltage and the insulation resistance.

Thus, the varistor manufactured by the method according to this embodiment has less leakage current, can operate at low voltage, exhibits excellent varistor characteristics, and is reliable. This is because potassium does not dissolve or is not removed during the manufacturing process and the raw materials have good dispersibility.

INDUSTRIAL APPLICABILITY

As described above, the varistor manufacturing method according to the present invention is suitable for the manufacture of a varistor that delivers high ability to protect electronic devices from surge currents and that is useful as, for example, a surge protector for various electronic devices.

The invention claimed is:

1. In a method for manufacturing a varistor, a step which comprises mixing and pulverizing zinc oxide, as the major component, and a compound containing potassium, as a minor component, by a wet process, wherein
the compound containing potassium is a poorly soluble potassium compound and the solubility of the poorly soluble potassium compound is 3 g or less in 100 g of aqueous at 25° C.

2. The method for manufacturing a varistor according to claim 1, wherein a compound containing praseodymium and a compound containing cobalt are used as additional minor components.

3. The method for manufacturing a varistor according to claim 2, wherein the poorly soluble potassium compound comprises at least one material selected from the group consisting of potassium perchlorate, potassium bitartrate, potassium hexachloroplatinate, and potassium hexanitrocobaltate.

4. The method for manufacturing a varistor according to claim 1, wherein the mixing and pulverizing step further comprises the addition of a polycarboxylate dispersant.

5. The method for manufacturing a varistor according to claim 4, wherein the amount of the polycarboxylate dispersant added is 0.1% to 5.0% by weight of the total weight of the major and minor components.

6. The method for manufacturing a varistor according to claim 1, wherein the mixing and pulverizing step is carried out with water.

7. The method for manufacturing a varistor according to claim 1, further comprising the steps of dehydrating and drying a material provided through the mixing and pulverizing step to prepare granules; calcining the granules to prepare a calcined powder; adding a binder and a solvent to the calcined powder to prepare a slurry for sheeting; forming a sheet from the slurry to prepare ceramic green sheets; forming conductor patterns of internal electrodes on the ceramic green sheets; laminating the ceramic green sheets having the conductor patterns to prepare a laminate; firing the laminate; and forming external electrodes on the fired laminate.

8. The method for manufacturing a varistor according to claim 7, wherein the mixing and pulverizing step is carried out with water.

9. The method br manufacturing a varistor according to claim 8, wherein the poorly soluble potassium compound comprises at least one material selected from the group consisting of potassium perchlorate, potassium bitartrate, potassium hexachloroplatinate, and potassium hexanitrocobaltate.

10. The method for manufacturing a varistor according to claim 9, wherein the mixing and pulverizing step further comprises the addition of a polycarboxylate dispersant.

11. The method fur manufacturing a varistor according to claim 10, wherein the amount of the polycarboxylate dispersant added is 0.1% to 5.0% by weight of the total wright of the major and minor components.

12. The method for manufacturing a varistor according to claim 11, wherein a compound containing praseodymium and a compound containing cobalt are used as additional minor components.

* * * * *